US009256813B2

(12) United States Patent
Robinson et al.

(10) Patent No.: US 9,256,813 B2
(45) Date of Patent: Feb. 9, 2016

(54) AUTOMATIC PRINT JOB TICKET SETTINGS BASED ON RASTER IMAGES OF PREVIOUSLY PRINTED DOCUMENT

(71) Applicant: XEROX CORPORATION, Norwalk, CT (US)

(72) Inventors: David C. Robinson, Penfield, NY (US); Gerald A. Wedekind, Ranchos Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/284,742

(22) Filed: May 22, 2014

(65) Prior Publication Data

US 2015/0339553 A1    Nov. 26, 2015

(51) Int. Cl.
*G06F 15/00* (2006.01)
*G06K 15/02* (2006.01)

(52) U.S. Cl.
CPC ........ *G06K 15/1868* (2013.01); *G06K 15/1825* (2013.01)

(58) Field of Classification Search
None
See application file for complete search history.

(56) References Cited

U.S. PATENT DOCUMENTS

| 6,469,795 | B2 * | 10/2002 | Beaudet et al. | 358/1.14 |
| 8,045,217 | B2 * | 10/2011 | Tanaka | 358/1.2 |
| 8,218,160 | B2 * | 7/2012 | Ferlitsch | G06F 3/1208 358/1.13 |
| 8,489,612 | B2 | 7/2013 | Cherkasova et al. | |
| 8,515,930 | B2 | 8/2013 | Hong | |
| 8,570,619 | B2 | 10/2013 | Kaigawa | |
| 8,896,866 | B2 * | 11/2014 | Fukushima | H04N 1/00222 358/1.15 |
| 2002/0113979 | A1 | 8/2002 | Rahgozar et al. | |
| 2004/0012802 | A1 * | 1/2004 | Allen et al. | 358/1.13 |
| 2006/0033967 | A1 * | 2/2006 | Brunner | 358/474 |
| 2006/0221358 | A1 * | 10/2006 | Takahashi | 358/1.1 |
| 2006/0285128 | A1 * | 12/2006 | Choi | G06F 3/1205 358/1.1 |
| 2006/0285142 | A1 * | 12/2006 | Cho | 358/1.13 |
| 2007/0070416 | A1 * | 3/2007 | Nakamura | 358/1.15 |
| 2007/0211287 | A1 * | 9/2007 | Fujii | 358/1.16 |
| 2009/0231609 | A1 * | 9/2009 | Chipchase et al. | 358/1.15 |
| 2012/0314954 | A1 | 12/2012 | Moore et al. | |
| 2012/0327463 | A1 * | 12/2012 | Mizuno | 358/1.15 |

* cited by examiner

*Primary Examiner* — Dung Tran
(74) *Attorney, Agent, or Firm* — Gibb & Riley, LLC

(57) ABSTRACT

Exemplary methods and devices herein receive the images of a previously printed document (through scanning, raster image processing, etc.), a second document to be printed, and instructions to use print settings of the previously printed document to print the second document. These methods and devices automatically detect page boundaries, detect page orientation, and detect page sequencing within the images of the previously printed document to identify previous layout parameters used to print the previously printed document. With this, these methods and devices automatically prepare a print job ticket for the second document that has job ticket layout parameters that match the previous layout parameters. After this, these methods and devices output (e.g., print or transmit for additional revisions/processing) the second document using the newly created print job ticket to cause the second document to match the previous layout parameters of the previously printed document.

20 Claims, 5 Drawing Sheets

AUTOMATIC PRINT JOB TICKET SETTINGS BASED ON RASTER IMAGES OF PREVIOUSLY PRINTED DOCUMENT

BACKGROUND

Systems and methods herein generally relate to print job settings and more particularly to methods and devices that prepare print job ticket settings.

Printing system users sometimes find themselves in the situation of having a document that has been printed or rasterized using various imposition settings (imposition settings are job settings that cause page images to be placed on print media at specific locations, orientations, and scalings) without access to such imposition settings, or with access only to the imposition settings in a format not consumable by currently available printing equipment. For example, the user may not be able to locate the job ticket of the previously printed document, or may not have access to the print queue that provided the previous imposition settings. Alternatively, the user may wish to utilize different printing equipment that cannot interpret the imposition settings used to print the previous document.

Therefore, the user may be in possession of a printed document (or the sheet images of a previously rasterized document) that has a desirable imposition layout; however, the user may have no way of obtaining the settings utilized to print the document according to this layout. In such a situation, the user will undertake the laborious and error-prone process of establishing various settings in order to arrive at the same imposition layout used in the previous document. This process can be frustrating and wasteful for the user, which can result in user dissatisfaction.

Exemplary methods herein receive, into a computerized device, the already-imposed sheet images of a previously printed document (created through scanning, raster image processing, etc.), a second document to be printed, and instructions to use the imposition settings of the previously printed document to print the second document. These methods automatically (using the computerized device) detect page boundaries, detect page orientation, and detect page sequencing within the sheet images of the previously printed document in order to identify the imposition parameters used to print the previously printed document. With this, these methods (again using the computerized device) automatically prepare a print job ticket for the second document that has imposition parameters that match the previous imposition parameters. After this, these methods output (e.g., print or transmit from the computerized device) the second document using the print job ticket to cause the imposition layout of the second document to match that of the previously printed document.

Additional methods herein similarly receive, into a computerized device, an image of a previously printed document (created through scanning, raster image processing, etc.), a second document to be printed, and instructions to use the imposition settings of the previously printed document to print the second document. These methods again automatically (using the computerized device) detect page boundaries, detect page orientation, and detect page sequencing within the sheet images of the previously printed document in order to identify the imposition parameters used to print the previously printed document. With this, these methods (again using the computerized device) automatically prepare a print job ticket for the second document that has imposition parameters that match the previous imposition parameters (to potentially allow such an automatically created job ticket to be manually edited by the user).

Other methods herein receive the sheet images of a document previously ripped according to certain imposition settings, and a different, alternative set of imposition settings, and these methods automatically produce a print job containing the same logical page images, but now imposed according to the alternative imposition settings instead of the previous imposition settings. These methods produce an imposition job ticket that can be used to perform the same imposition transformation on similarly-imposed jobs in the future.

The process of detecting page boundaries can be, for example, based on: finisher alignment marks in the images of the previously printed document; bounding boxes of non-white content in the images of the previously printed document; margin consistency in the images of the previously printed document; spacing of pages in the images of the previously printed document; page height and width in the images of the previously printed document; page size consistency in the images of the previously printed document; size of imposed sheet in the images of the previously printed document; and/or comparison of inferred page size within tolerances to commonly-used sizes in the images of the previously printed document; etc.

The process of detecting page orientation can be, for example, based on: recognizing text, text lines, and blocks in the images of the previously printed document; placement and orientation of page numbers in the images of the previously printed document; and/or inferences from overall layout geometry of the images of the previously printed document; etc.

The process of detecting page sequencing can be, for example, based on: identifying sequential page numbers at repeatable standard locations in the images of the previously printed document; and/or performing sentence-level grammatical analysis, when sentences break across adjacent pages in the images of the previously printed document; etc.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
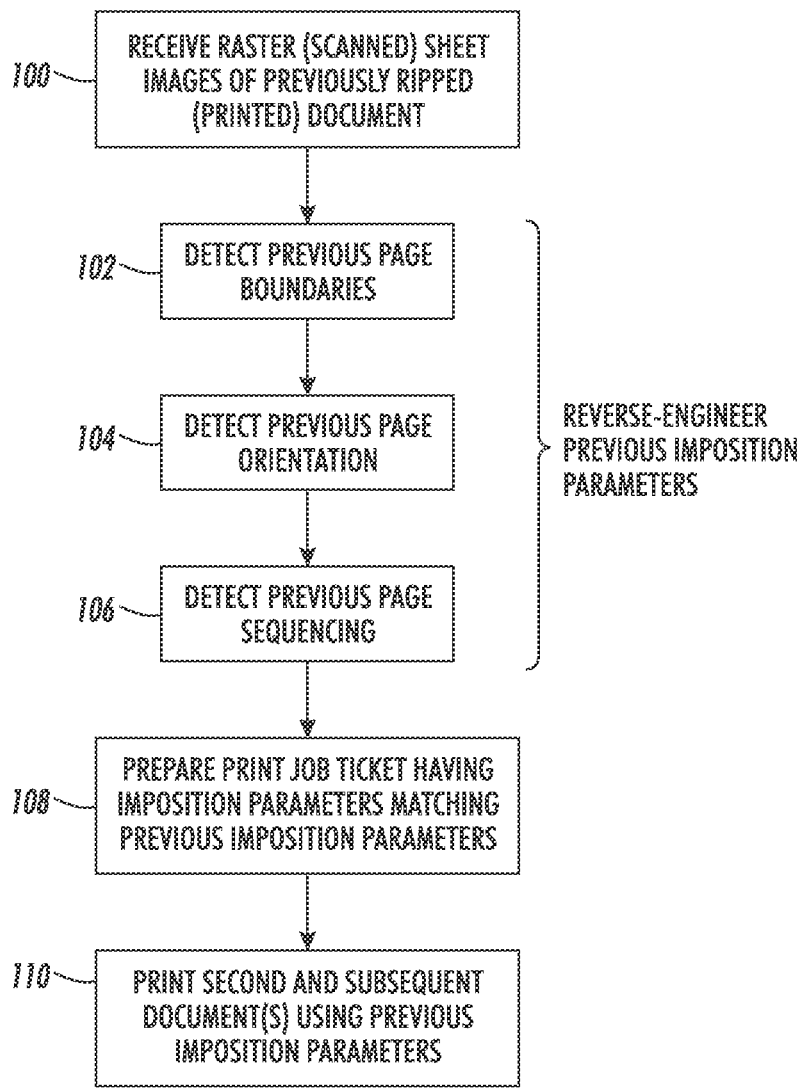
FIG. 1 is a flow diagram of various methods herein, applied to the scenario in which a user wishes to print additional jobs with the same imposition layout used on a previously printed job.

As mentioned above, a user may be in possession of a printed document that has a desirable format and printing arrangement; however, the user may have no way of obtaining the settings utilized to print the document. For example, the previous printing job may have been printed using previous imposition settings; and the user can obtain bitmaps or rasterized images of the document using a scanner or digital processor. In some situations, the user may wish to print a subsequent job using the same imposition settings used to print the previous printed document. In other situations, the user may desire to reprint the same job with modified (user-specified) changes to the previous imposition settings. However, because the user is unable to obtain the previous imposition settings in usable form, the reuse of such settings becomes very difficult.

Therefore, the systems and methods herein provide an automated system that analyzes the bitmaps or raster images of the previously printed job in order to determine the imposition settings that were used to print or create the previous job. While the examples herein sometimes discuss automatically determining the imposition settings of a previously printed document, the methods and devices herein can automatically determine the imposition settings of a document that has never actually been printed. More specifically, the methods and devices herein can automatically determine the imposition settings of scanned images, raster images (ripped sheet images of a previously imposed job), etc. Therefore, when the phrase "previously printed" job as used herein, it is intended to cover all forms of a previous document that utilized any form of imposition settings.

With respect to situations where the user desires to apply previous imposition settings to a subsequent job, the methods and devices herein reverse engineer the previously-applied imposition settings and then produce an imposition job ticket that is compatible with the user's printing systems. This allows the user to then print the subsequent print job using a new job ticket resulting from the automatically determined imposition settings of the previously printed document.

With respect to situations where the user desires to modify the previous imposition settings (to reprint the previously imposed job as specific, different imposition settings had originally been requested), the imposition settings used for the previously printed document can be reversed engineered (and a job ticket can be automatically produced) as discussed above. In addition, the methods and devices here can determine an optimal transformation that will cause a sequence of sheet images produced according to the previous imposition settings to be transformed into a sequence of sheet images produced according the new, different imposition settings. This transformation can be saved as a job ticket, which represents the difference between the new imposition settings and the previous imposition settings. The user can then use this job ticket to reprint the previous document (or any other document previously printed using the same previous imposition settings) according to the new imposition settings rather than according to the previous ones.

Thus, for example, given an alternate desired imposition layout L2, these methods can output a set of imposition layout settings (L2-L1) that, when used to print a job whose sheet images (available in raster format) were previously created according to previous imposition layout L1, causes the same job content to instead be printed according to imposition layout L2. Options to input and modify user-specified layout settings relating to, for example, transforming the automatically created job ticket for different size media, different N-up settings, differently orientations, etc., can be input through a graphic user interface of the computerized device. In order to do this, these methods determine the transformations needed to bridge the gap between L1 and L2, and represent those transformations via job ticket settings, which can be applied to any image-format job already imposed according to imposition layout L1.

The methods and devices herein can be provided as a standalone library or as a subsystem within an existing system component, such as a printing systems digital front end (DFE) or other printing system application platform. By automatically determining previous imposition settings used to print previous documents and automatically creating print job tickets representing such imposition settings (or representing the transformation between such imposition settings and a specific, alternate set of imposition settings), the methods and devices herein accelerate, simplify and reduce errors in printing and prepress operations in imposition-intensive printing environments.

In a more specific discussion, with respect to identifying the logical page boundaries, the methods and devices herein may identify logical page boundaries within the imposed sheet images by searching for cut marks. Cut marks are printed alignment marks (such as a "+" sign) used to align printed sheets within finishing equipment prior to cutting. Searching for cut marks involves searching for a repeatable pattern of well-defined marks at likely locations in the overall image. If the cut marks are found, the devices and methods herein assume that these demark the logical page boundaries (logical pages are pages of the electronic form document to be printed). However, if cut marks are not found, the methods and devices herein can identify the bounding boxes (BBs) of non-white content, and infer logical page boundaries based on these bounding boxes together with a set of default assumptions concerning relevant parameters (e.g., margin consistency, spacing of logical pages, logical page height and width, logical page size consistency, size of imposed sheet, comparison of inferred logical page size (within tolerance) to commonly-used sizes, etc.).

With respect to identifying the logical page orientation, the methods and devices herein recognize text or text lines/blocks on the logical page (through optical character recognition (OCR), through pixel pattern recognition, etc.); recognize placement and orientation of page numbers; and/or observe and make inferences from the overall layout geometry.

With respect to identifying logical page sequencing (e.g., repeat vs. sequential vs. signature), the methods and devices herein can leverage page numbers of the logical pages, if available. This involves locating and recognizing (using, for example, OCR) isolated sequential numbers at repeatable standard locations across logical pages. Exceptions (for chapter starts, front matter, etc.) are tolerated by methods and devices herein. Additionally, logical page sequencing can be identified by text analysis. For example, in long text-intensive documents with consistent layouts, logical page ordering can be inferred with high confidence if there are a sufficient number of guesses (which need only be of low confidence) concerning the ordering of individual pairs of logical pages. This pairwise logical page ordering can in turn be inferred using sentence-level grammatical analysis, when sentences break across adjacent logical pages; or using higher-level analysis when such sentence breaks are rare or nonexistent.

With respect to the scenario in which a user wishes to print a previously-imposed job with new imposition parameters, the methods and devices herein undertake the following processes. To produce each sheet image of the job imposed according to the new imposition parameters, the system determines which logical page images will be placed in this sheet image. For each such logical page, the system the determines a) the sheet number, bounding box and orientation of that page image in the previously printed job, and b) the bounding box and orientation of that page image according to the new imposition layout. The system then determines an optimal transformation (for example, a combination of scaling and orthogonal rotation) which will map the previous bounding box to the new bounding box. The systems and methods herein then copy the image data from the previous bounding box within the previous sheet image, transforms the image data according to the above transformation, and places the transformed image data into the new bounding box in the new sheet image. Once the transformed images of all member pages have been placed within a given sheet image, the newly imposed sheet image is complete. Once all of the newly imposed sheet images in the job have been created and printed, the newly imposed job is complete.

Depending upon the job or imposition specifics, it may be necessary to employ heuristic or approximation methods to infer the imposition settings used. The reliability of such methods can be increased by algorithmically analyzing results across multiple sheet images (to confirm consistency, or reduce uncertainty); and allowing users to interactively confirm and/or tweak the reverse-engineered settings. Additionally, if this processing impacts image quality, the methods and devices herein can notify the user of this occurrence.

Various aspects of this capability may be made user configurable, including notification levels, job ticket format produced, degree of certainty required when reverse engineering an imposition, which heuristic approaches to employ, image quality tradeoff approach, which default assumptions to make, etc. Therefore, the methods and devices herein automatically reverse engineer an imposed job in raster format with options for either developing an imposition template for future jobs or re-imposing the raster content.

FIG. 1 is flowchart illustrating exemplary methods herein. In item 100, these methods receive, into a computerized device, the images of a previously printed document (through scanning, raster image processing, etc.), a second document to be printed, and instructions to use print settings of the previously printed document to print the second document. Therefore, in item 100, these methods receive raster (scanned) sheet images of a previously ripped (printed) document. As noted above, the "second" document to be printed can be document that is different than the originally printed (or rasterized) document, or the "second" document can be the same document that was originally printed that the user now desires to print using different imposition settings or different printing equipment. The instructions that are received in item 100 can be supplied by the user selecting an option provided on a graphic user interface menu. The instructions can also include user preferences including notification levels, job ticket format, degree of certainty required when reverse engineering an imposition, which heuristic approaches to employ, image quality tradeoff approach, default assumptions, etc.

Items 102-106 illustrate the details of the reverse engineering of parameters that is performed on the scanned or rasterized images in order to arrive at the imposition settings that were used to previously print or rasterize the previous document. Therefore, the processing in items 102-106 is able to establish various imposition settings (e.g., number of document pages printed per sheet (N-up settings), printing orientation, printing quality, etc.) merely from analyzing the bitmaps or raster images.

More specifically, these methods automatically (using the computerized device) detect previous page boundaries (item 102) within the images of the previously printed document to identify previous layout parameters used to print the previously printed document. The process of detecting page boundaries is, for example, based on: finisher alignment marks in the images of the previously printed document; bounding boxes of non-white content in the images of the previously printed document; margin consistency in the images of the previously printed document; spacing of pages in the images of the previously printed document; logical page height and width in the images of the previously printed document; logical page size consistency in the images of the previously printed document; size of imposed sheet in the images of the previously printed document; and/or comparison of inferred page size within tolerances to commonly-used sizes in the images of the previously printed document; etc.

These methods automatically (using the computerized device) detect previous page orientation (item 104) within the images of the previously printed document to identify previous layout parameters used to print the previously printed document. The process of detecting page orientation is, for example, based on: recognizing text, text lines, and blocks in the images of the previously printed document; placement and orientation of page numbers in the images of the previously printed document; and/or inferences from overall layout geometry of the images of the previously printed document; etc.

These methods automatically (using the computerized device) detect previous page sequencing (item 106) within the images of the previously printed document to identify previous layout parameters used to print the previously printed document. The process of detecting page orientation is, for example, based on: identifying sequential page numbers at repeatable standard locations in the images of the previously printed document; and/or performing sentence-level grammatical analysis, when sentences break across adjacent logical pages in the images of the previously printed document; etc.

With this, these methods (again using the computerized device) automatically prepare a print job ticket for the second document that has job ticket layout parameters that match the previous layout parameters in item 108. Thus, in item 108, the methods herein prepare a print job ticket having imposition parameters matching previous imposition parameters. When preparing the job ticket, the methods and devices herein take the page boundaries, page orientation, page sequencing, etc., determined in items 102-106 and evaluate the same considering the capabilities and limitations of the currently available printing and finishing devices. The methods and devices herein find the closest match between the capabilities of the currently available printing and finishing equipment and the imposition settings found in items 102-106.

After this, in item 110, these methods output (e.g., print or transmit from the computerized device) the second document using the transformed print job ticket to cause the second document to match the previous layout parameters of the previously printed document, as transformed by the geometric transformation process. Therefore, in item 110, these methods print second and subsequent document(s) using previous imposition parameters.

Figure 2:
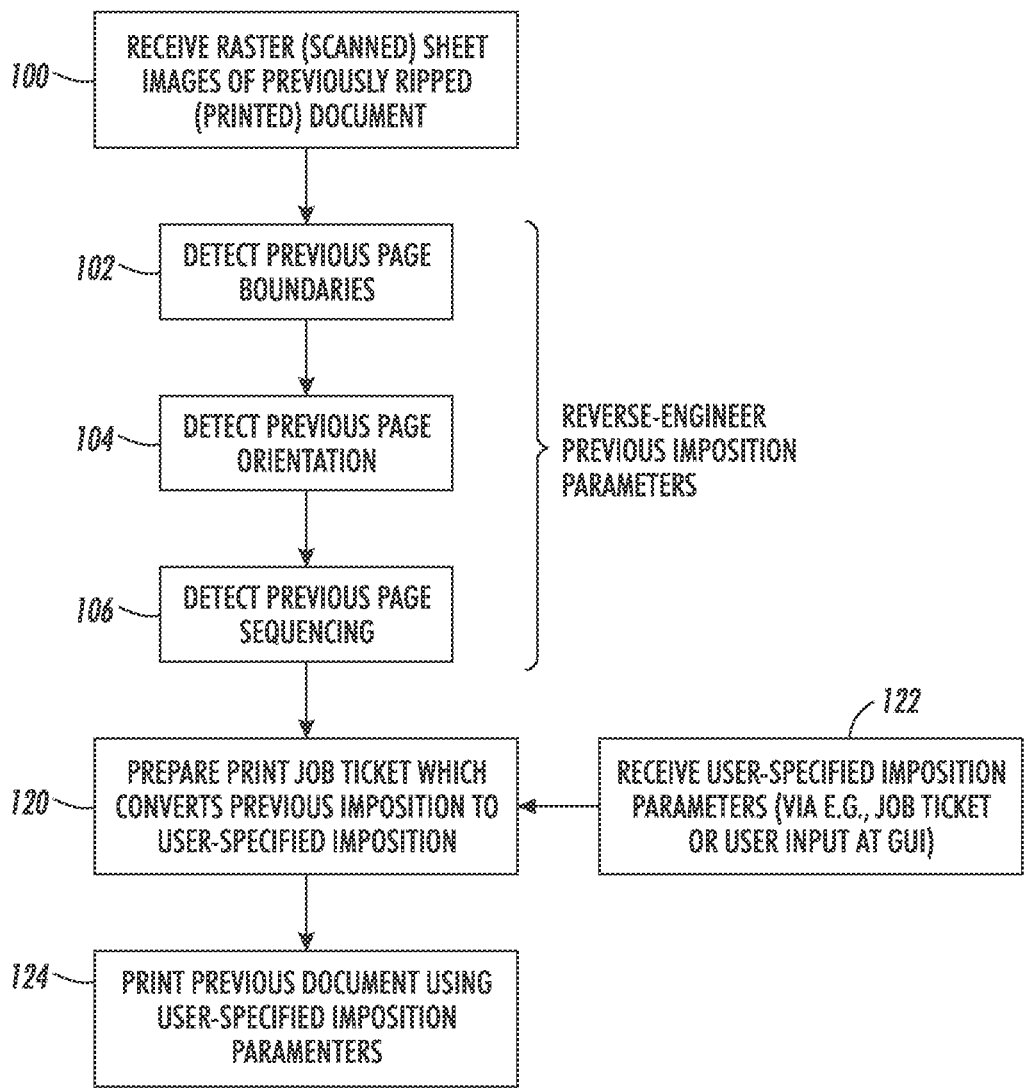
FIG. 2 is a flow diagram of various methods herein, applied to the scenario in which a user wishes to print a previously-imposed job with new imposition parameters.

FIG. 2 is a flow diagram of a different exemplary method that uses the same processing through step 106 (and incorporation by reference is made to the previous steps that are provided the same numbering in FIGS. 1 and 2, and a redundant discussion of the same is avoided here); however, this exemplary method provides different steps, beginning with item 120. As shown in item 120, these methods (again using the computerized device) automatically prepare a print job ticket for the second document that has job ticket layout parameters that match the previous layout parameters.

More specifically, in item 120, the methods herein prepare a print job ticket by converting the previous imposition to a user-specified imposition. Again, when preparing the job ticket, the methods and devices herein take the page boundaries, page orientation, page sequencing, etc., determined in items 102-106, and evaluate the same considering the capabilities and limitations of the currently available printing and finishing devices. The methods and devices herein find the closest match between the capabilities of the currently available printing and finishing equipment and the imposition settings found in items 102-106.

However, in item 120, these methods can output, through a graphic user interface of the computerized device, options to input and modify user-specified layout settings relating to, for example, transforming the automatically created job ticket for different size media, different N-up settings, differently orientations, etc. More specifically, in item 120, the job ticket produced, when supplied to the system, will cause the system's hardware and software to transform a document (actually, a series of sheet images) that was created using the previous imposition parameters, into a series of sheet images containing the same document content, but now imposed according to the new (user-specified) imposition parameters. Here, "imposed" refers to the placement, orientation, sizing, and sequencing of the job's page images within the sheet images, thus within the physical sheets ultimately delivered.

Therefore, these methods automatically (using the computerized device) geometrically transform the job ticket layout parameters of the print job ticket in item 120 based on the user-specified layout settings (to generate a transformed print job ticket) provided in item 122. Thus, item 122 illustrates receiving (from the user) user-specified imposition parameters via, for example, a user-supplied job ticket or user input at the user interface. In item 124, these methods print the previous document using the user-specified imposition parameters.

In some uses of methods herein, only the "fundamental" imposition parameters (n-up, orientation, ordering, etc.) are reverse engineered and re-used. The other imposition parameters, (e.g., "detailed" imposition parameters, such as bleed mode, creep/margins, cut marks, etc.) may optionally not be reverse engineered, if it is not cost effective to do so. In such applications, the methods and systems herein handle detailed imposition parameters in various ways. For example, such methods and system can set the detailed imposition parameters to default values, and then allow users to manually tweak the detailed imposition parameters as needed on a per-job basis.

Therefore, the methods and devices herein not only automatically identify the imposition settings that were utilized when creating and printing the previous document from only the scan of the previously printed document, but these methods and devices also make a job ticket that can be utilized by the printing and finishing equipment currently available to the user so as to match the previous imposition settings as closely as possible (given the limitations of the currently available equipment). Therefore, while the imposition settings utilized to create or print the previous document may not be able to be matched exactly because of limitations of the currently available printing and finishing equipment, the methods and devices herein adjust such imposition settings to provide the best match possible given such mechanical limitations.

Figure 3:
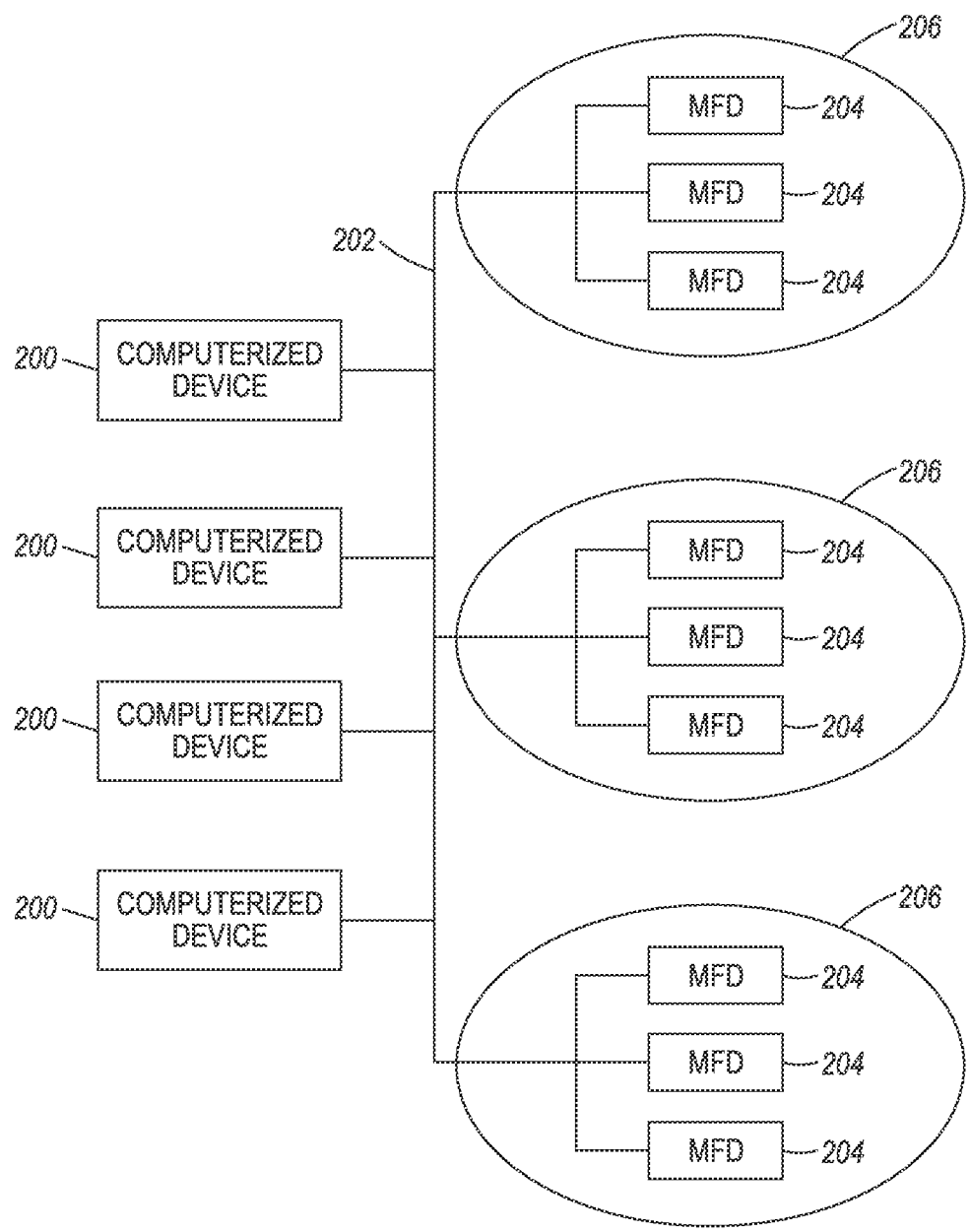
FIG. 3 is a schematic diagram illustrating systems herein.

As shown in FIG. 3, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
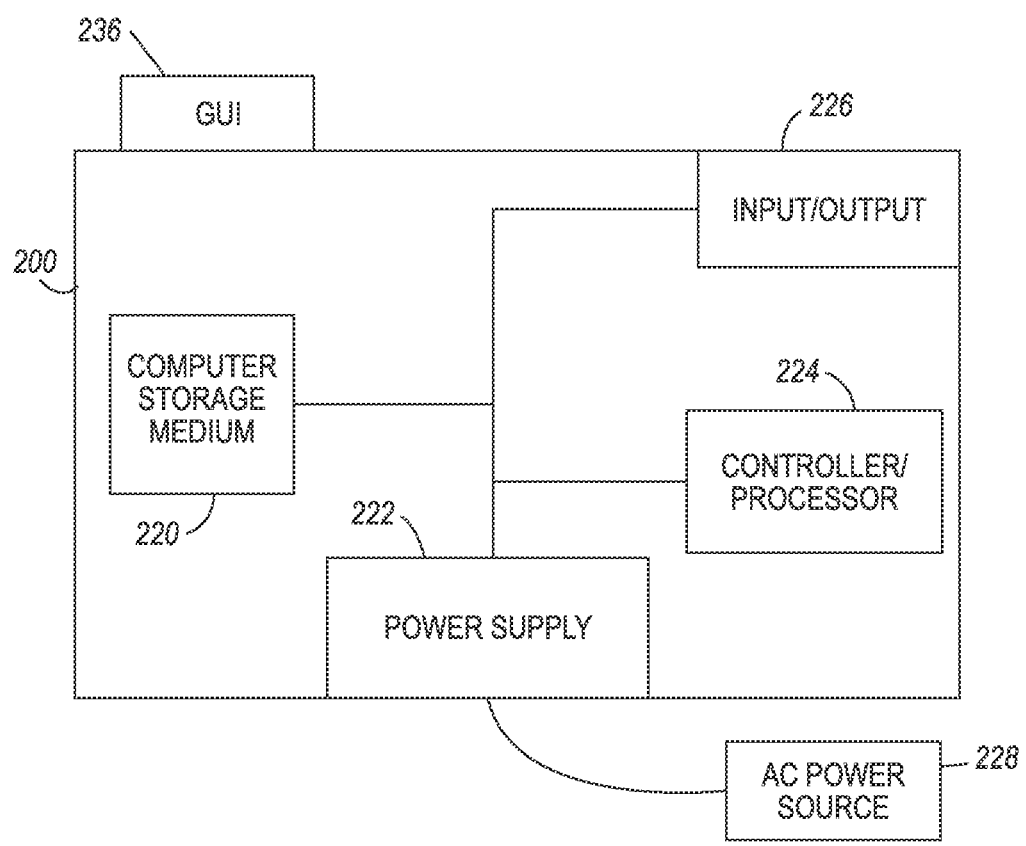
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 4, a body housing has one or more functional components that operate on power supplied from an alternating current (AC) source 228 by the power supply 222. The power supply 222 can comprise a power storage element (e.g., a battery, etc).

Figure 5:
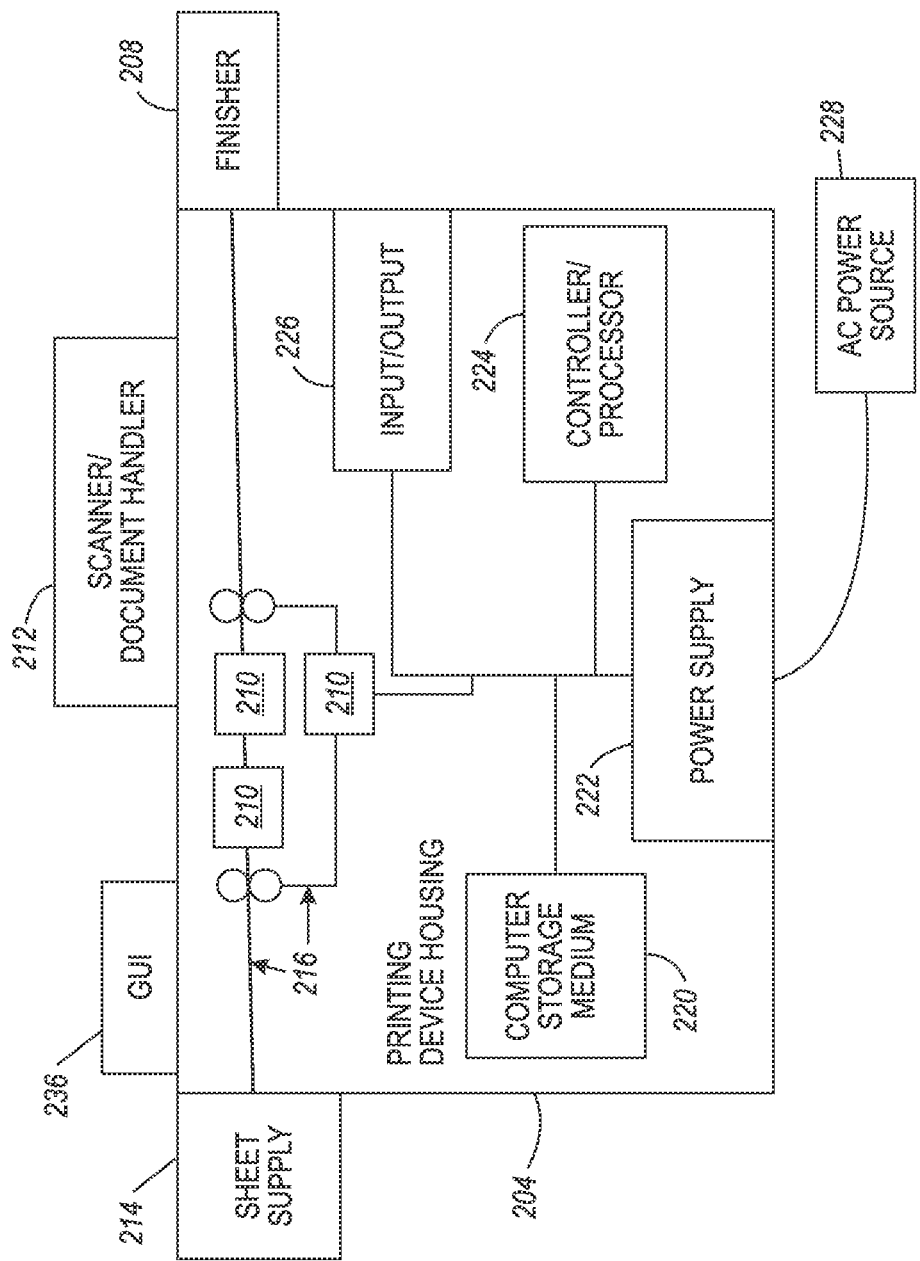
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, computerized devices 200, 204 herein include a processor 224 that receives images of a previously printed document (through scanning, raster image processing, etc.), a second document to be printed, and instructions to use print settings of the previously printed document to print the second document. The processor 224 automatically detects page boundaries, detects page orientation, and detects page sequencing within images of the previously printed document to identify previous layout parameters used to print the previously printed document. The processor 224 also automatically prepares a print job ticket for the second document having job ticket layout parameters that match the previous layout parameters.

The processor 224 automatically geometrically transforms the job ticket layout parameters of the print job ticket based on user-specified layout settings (that may be input using a graphic user interface 236 of the computerized devices) to generate a transformed print job ticket. The processor 224 outputs the second document (through the network 202, a printer 204, etc.) using the transformed print job ticket to cause the second document to match the previous layout parameters of the previously printed document as transformed by the geometrically transforming.

As would be understood by those ordinarily skilled in the art, the printing device 204 shown in FIG. 5 is only one example and the systems and methods herein are equally applicable to other types of printing devices that may include fewer components or more components. For example, while a limited number of printing engines and paper paths are illustrated in FIG. 5, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a computerized device, images of a previously printed document, a second document to be printed, and instructions to use previous layout parameters of said previously printed document to print said second document, without providing access to said previous layout parameters of said previously printed document;
   automatically reverse engineering said previous layout parameters used to print said previously printed document from said images of said previously printed document, without access to said previous layout parameters, using said computerized device, by detecting page boundaries, detecting page orientation, and detecting page sequencing within said images of said previously printed document;
   automatically, using said computerized device, preparing a print job ticket for said second document having job ticket layout parameters matching said previous layout parameters; and
   outputting, from said computerized device, said second document using said print job ticket to cause said second document to match said previous layout parameters of said previously printed document.

2. The method according to claim 1, further comprising outputting, through a graphic user interface of said computerized device, options to modify layout parameters of said print job ticket.

3. The method according to claim 1, said detecting page boundaries being based on at least one of:
   finisher alignment marks in said image of said previously printed document;
   bounding boxes of non-white content in said image of said previously printed document;

margin consistency in said images of said previously printed document;
spacing of pages in said images of said previously printed document;
logical page height and width in said images of said previously printed document;
logical page size consistency in said images of said previously printed document;
size of imposed sheet in said images of said previously printed document; and
comparison of inferred page size within tolerances to commonly-used sizes in said images of said previously printed document.

4. The method according to claim 1, said detecting page orientation being based on at least one of:
recognizing text, text lines, and blocks in said images of said previously printed document;
placement and orientation of page numbers in said images of said previously printed document; and
inferences from overall layout geometry of said images of said previously printed document.

5. The method according to claim 1, said detecting page orientation being based on at least one of:
identifying sequential page numbers at repeatable standard locations in said images of said previously printed document; and
performing sentence-level grammatical analysis, when sentences break across adjacent pages in said images of said previously printed document.

6. A method comprising:
receiving, into a computerized device, images of a previously printed document, a second document to be printed, and instructions to use previous layout parameters of said previously printed document to print said second document without providing access to said previous layout parameters of said previously printed document;
automatically reverse engineering said previous layout parameters used to print said previously printed document from said images of said previously printed document, without access to said previous layout parameters, using said computerized device, by detecting page boundaries, detecting page orientation, and detecting page sequencing within said images of said previously printed document;
automatically, using said computerized device, preparing a print job ticket for said second document having job ticket layout parameters matching said previous layout parameters;
automatically, using said computerized device, geometrically transforming said job ticket layout parameters of said print job ticket based on user-specified layout settings to generate a transformed print job ticket; and
outputting, from said computerized device, said second document using said transformed print job ticket to cause said second document to match said previous layout parameters of said previously printed document as transformed by said geometrically transforming.

7. The method according to claim 6, further comprising outputting, through a graphic user interface of said computerized device, options to input and modify said user-specified layout settings.

8. The method according to claim 6, said detecting page boundaries being based on at least one of:
finisher alignment marks in said images of said previously printed document;
bounding boxes of non-white content in said images of said previously printed document;
margin consistency in said images of said previously printed document;
spacing of pages in said images of said previously printed document;
logical page height and width in said images of said previously printed document;
logical page size consistency in said images of said previously printed document;
size of imposed sheet in said images of said previously printed document; and
comparison of inferred page size within tolerances to commonly-used sizes in said images of said previously printed document.

9. The method according to claim 6, said detecting page orientation being based on at least one of:
recognizing text, text lines, and blocks in said images of said previously printed document;
placement and orientation of page numbers in said images of said previously printed document; and
inferences from overall layout geometry of said images of said previously printed document.

10. The method according to claim 6, said detecting page orientation being based on at least one of:
identifying sequential page numbers at repeatable standard locations in said images of said previously printed document; and
performing sentence-level grammatical analysis, when sentences break across adjacent pages in said images of said previously printed document.

11. A computerized device comprising:
a processor receiving images of a previously printed document, a second document to be printed, and instructions to use previous layout parameters of said previously printed document to print said second document, without providing access to said previous layout parameters of said previously printed document;
said processor automatically reverse engineering said previous layout parameters used to print said previously printed document from said images of said previously printed document, without access to said previous layout parameters, by detecting page boundaries, detecting page orientation, and detecting page sequencing within said images of said previously printed document,
said processor automatically preparing a print job ticket for said second document having job ticket layout parameters matching said previous layout parameters, and
said processor outputting said second document using said print job ticket to cause said second document to match said previous layout parameters of said previously printed document.

12. The computerized device according to claim 11, further comprising a graphic user interface, operatively connected to said processor, outputting options to modify layout parameters of said print job ticket.

13. The computerized device according to claim 11, said processor detecting said page boundaries by at least one of:
finisher alignment marks in said images of said previously printed document;
bounding boxes of non-white content in said images of said previously printed document;
margin consistency in said images of said previously printed document;
spacing of pages in said images of said previously printed document;

logical page height and width in said images of said previously printed document;
logical page size consistency in said images of said previously printed document;
size of imposed sheet in said images of said previously printed document; and
comparison of inferred page size within tolerances to commonly-used sizes in said images of said previously printed document.

14. The computerized device according to claim 11, said processor detecting said page orientation by at least one of:
recognizing text, text lines, and blocks in said images of said previously printed document;
placement and orientation of page numbers in said images of said previously printed document; and
inferences from overall layout geometry of said images of said previously printed document.

15. The computerized device according to claim 11, said processor detecting said page orientation by at least one of:
identifying sequential page numbers at repeatable standard locations in said images of said previously printed document; and
performing sentence-level grammatical analysis, when sentences break across adjacent pages in said images of said previously printed document.

16. A computerized device comprising:
a processor receiving images of a previously printed document, a second document to be printed, and instructions to use previous layout parameters of said previously printed document to print said second document, without providing access to said previous layout parameters of said previously printed document;
said processor automatically reverse engineering said previous layout parameters used to print said previously printed document from said images of said previously printed document, without access to said previous layout parameters, by detecting page boundaries, detecting page orientation, and detecting page sequencing within said images of said previously printed document,
said processor automatically preparing a print job ticket for said second document having job ticket layout parameters matching said previous layout parameters,
said processor automatically geometrically transforming said job ticket layout parameters of said print job ticket based on user-specified layout settings to generate a transformed print job ticket, and
said processor outputting said second document using said transformed print job ticket to cause said second document to match said previous layout parameters of said previously printed document as transformed by said geometrically transforming.

17. The computerized device according to claim 16, further comprising a graphic user interface, operatively connected to said processor, outputting options to input and modify said user-specified layout settings.

18. The computerized device according to claim 16, said processor detecting said page boundaries by at least one of:
finisher alignment marks in said images of said previously printed document;
bounding boxes of non-white content in said images of said previously printed document;
margin consistency in said images of said previously printed document;
spacing of pages in said images of said previously printed document;
logical page height and width in said images of said previously printed document;
logical page size consistency in said images of said previously printed document;
size of imposed sheet in said images of said previously printed document; and
comparison of inferred page size within tolerances to commonly-used sizes in said images of said previously printed document.

19. The computerized device according to claim 16, said processor detecting said page orientation by at least one of:
recognizing text, text lines, and blocks in said images of said previously printed document;
placement and orientation of page numbers in said images of said previously printed document; and
inferences from overall layout geometry of said images of said previously printed document.

20. The computerized device according to claim 16, said processor detecting said page orientation by at least one of:
identifying sequential page numbers at repeatable standard locations in said images of said previously printed document; and
performing sentence-level grammatical analysis, when sentences break across adjacent pages in said images of said previously printed document.

* * * * *